United States Patent [19]

Derks

[11] 4,392,132

[45] Jul. 5, 1983

[54] WIRELESS SIGNALING SYSTEM

[75] Inventor: Harry G. Derks, Holland, Mich.

[73] Assignee: Fleetwood Furniture Company, Zeeland, Mich.

[21] Appl. No.: 273,374

[22] Filed: Jun. 15, 1981

[51] Int. Cl.[3] .......................... H04Q 9/16; H04Q 9/00

[52] U.S. Cl. ................................ 340/825.14; 370/100

[58] Field of Search ...................... 340/825.69, 825.14, 340/825.17, 825.44, 825.22, 825.29; 370/100

[56] References Cited

U.S. PATENT DOCUMENTS

| | | | |
|---|---|---|---|
| 3,261,011 | 7/1966 | Crosthwait . | |
| 3,445,815 | 5/1969 | Saltzberg et al. | 340/825.14 |
| 4,017,831 | 4/1977 | Tieden et al. | 340/825.17 |
| 4,107,608 | 8/1978 | Saburi . | |

*Primary Examiner*—Thomas A. Robinson
*Attorney, Agent, or Firm*—Price, Heneveld, Huizenga & Cooper

[57] ABSTRACT

A wireless signaling between one or more remote locations and a central location includes a transmitter at each remote location and switches for providing signals indicating status information on each remote location. A logic circuit coupled to the switches and to the transmitter provide signals effecting transmission of a signal modulated to uniquely identify the remote location and the status represented by the switches. A receiver at the central location is coupled to a second logic circuit for decoding the signals received from the transmitter and is coupled to indicators for providing an indication of the status at the first location.

8 Claims, 4 Drawing Figures

WIRELESS SIGNALING SYSTEM

BACKGROUND OF THE INVENTION

The present invention relates to a status signaling system and particularly to a system which is wireless.

In office and other environments, it is frequently desirable to provide nonverbal communications from one location to another indicating the status of, for example, the occupant of an office. Frequently, where an individual is engaged in a conference or otherwise does not want to be disturbed, interrupting phone calls, visitors, or the like can disrupt the meeting and/or thought concentration. In such a setting, it may also be desirable to communicate the fact that the individual does not want to be disturbed not only to, for example, the occupant's immediate staff, but also to, for example, a central clearing position such as a receptionist.

There exist several direct wired systems which provide systems by which the status of, for example, hotel rooms doctor's office rooms or the like have been provided with indicator lights to display to a central area the status of the room occupation. Representative of the numerous direct wired light and switch combinations include for example, U.S. Pat. Nos. 2,682,654; 2,980,890, 3,155,597; 3,214,747; 3,228,020; 3,230,520; 3,254,335; 3,261,011; 3,430,244; 3,440,641; and 3,893,098. In each of these systems, switches are provided to typically provide two-way communications between first and second locations via direct interconnecting wire such that the status at one location can be monitored at a remote location and vice versa. Although these systems provide the desired signaling, they all involve permanent interconnecting wiring which, when multiple stations are involved, can require a significant number of interconnecting wires. Naturally, unless the system is installed during the initial construction of a building or office complex, its subsequent installation can require significant electrical wiring which may involve the removal of wall board, ceiling panels or the like.

SUMMARY OF THE PRESENT INVENTION

The system of the present invention overcomes the deficiencies of the prior art by providing two-way communications between one or more remote or first locations to one or more central or second locations by providing a transmitter located at one location, means for providing signals indicating the status at said one location and logic circuit means coupled to providing means and to the transmitter for providing signals effecting transmission of a signal modulated to uniquely identify the location and the status represented by the providing means. A receiver is located at a second location and is coupled to a second logic circuit means for decoding the signals received from the transmitter and is coupled to indicator means for providing an indication of the status at the first location.

In one embodiment of the present invention, all of the locations contain a transmitter, receiver and logic circuit means such that two-way communications are possible. In a further embodiment of the invention, the multiple stations are intercoupled utilizing single frequency transmission by time division multiplexing signals in assigned time intervals and multiple status information can be provided by dividing each time interval into separate data intervals. In order to assure synchronization of, for example, a single receptionist station with multiple remote locations, a burst synchronization signal can be transmitted to synchronize each of the logic circuits to respond only to the time interval with which the remote unit is associated.

In the preferred embodiment of the invention, RF transmission is employed which is CW modulated to provide the desired data transmission between a plurality of first locations and a second location.

These and other features, objects and advantages of the present invention can be best understood by reference to the following description thereof together with reference to the drawings in which.

DETAILED DESCRIPTION OF THE PREFERRED EMBODIMENT

Figure 1:
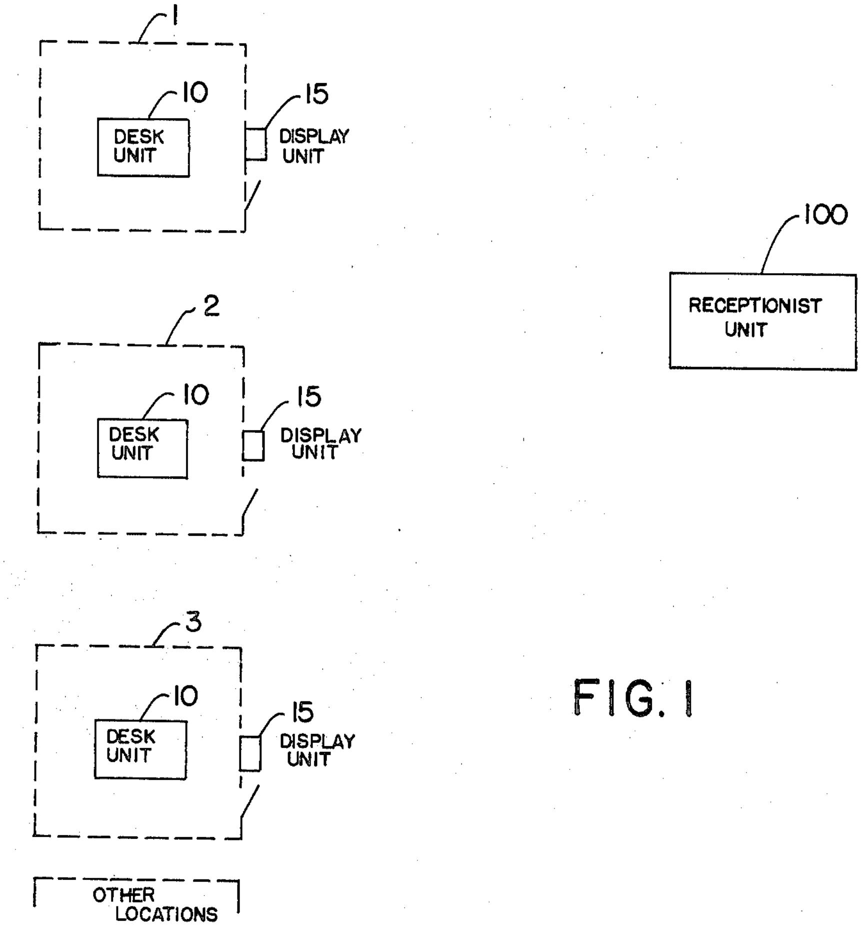
FIG. 1 is a schematic illustration of a system embodying the present invention in which three first locations are shown for communicating status information to a single second location.

Referring initially to FIG. 1 there is shown a system embodying the present invention which is employed for example in an office complex having several offices with only office numbers 1, 2, and 3 illustrated. It is understood that the system of the present invention can be employed for 25 or more remote first locations such as offices. The system can be expanded to include a significantly larger number of remote locations if desired. Each office includes a substantially identical desk unit 10 which is shown in detail in FIG. 2 and may also optionally include a display unit 15 mounted outside the office on the wall or at a secretary's station for providing a status display at that location. Further, the system of FIG. 1 includes a centrally located receptionist unit 100 typically located at the reception area of the office which normally is centrally located some distance from the offices themselves. In the system of the preferred embodiment, as will be explained in more detail hereinafter, each of the desk units 10 are substantially identical with the exception that the coding selected for each unit is unique and different from other offices so as to uniquely identify to the receptionist unit 100 the particular desk unit for a given office. The system of the preferred embodiment employs RF transmission of a continuous wave (i.e. CW) modulated transmitter and receiver located in each of the desk units and a similar unit tuned to the same frequency at the receptionist unit 100 to provide two-way communications between the receptionist unit and each of the desk units. The coding arrangement employed provides a repetitive interrogation cycle which in the preferred embodiment is related to line frequency (i.e. 60 Hz) and constitutes 128 data intervals at 120 Hz frequency thereby constituting an interrogation interval of 1.067 seconds, which is continuously repeated. Each of the interrogation cycles, in turn, is divided into several time intervals with a unique time interval being associated with each of the desk units. The desk units and receptionist unit each include logic circuits which are synchronized with one another such that status signals occurring within data intervals in a given time interval will activate status indicator lights in the receptionist unit associated with that desk unit. In order to assure accurate transfer of information between the desk units and the receptionist unit, a synchronization signal is transmitted during each of the interrogation intervals to synchronize the logic circuits. Thus, the receptionist unit monitors each of the 25 or more desk units each second and updates the status information at this frequency.

Each of the desk units in the preferred embodiment of the invention includes, as will be described more fully hereinafter, a three position switch for activating a red, yellor or green indicator light at the receptionist unit 100 and optionally at each of the display unit 15. A red condition indicates that the occupant of the office does not want to be disturbed, a yellow indicator light indicates that the occupant is to be distrubed only according to certain criteria, such as only if a particular individual calls or wants to meet with the occupant. A green indicator light indicates that the occupant of the office is available for phone calls and other communications. If the desk unit is deactivated so no lights are illuminated, this condition indicates that the office is unoccupied.

In the preferred embodiment of the invention also, the receptionist can signal the occupant of the office of the receipt of a phone call which causes the simultaneous flashing of the display lights also contained on each of the desk units 10 indicating to the occupant the existence of an incoming call. As can be appreciated, the receptionist unit 100 includes an array of red, yellow and green indicator lights with a set of such lights for each of the offices being monitored. With the utilization of a CW modulated RF signal, it can also be appreciated that a given office building may include several such installations each assigned a predetermined frequency so they can operate independently of one another.

Having briefly described the overall system concept and its environment, a detailed description of one of the substantially identical desk units and a receptionist unit is now presented.

Figure 2:
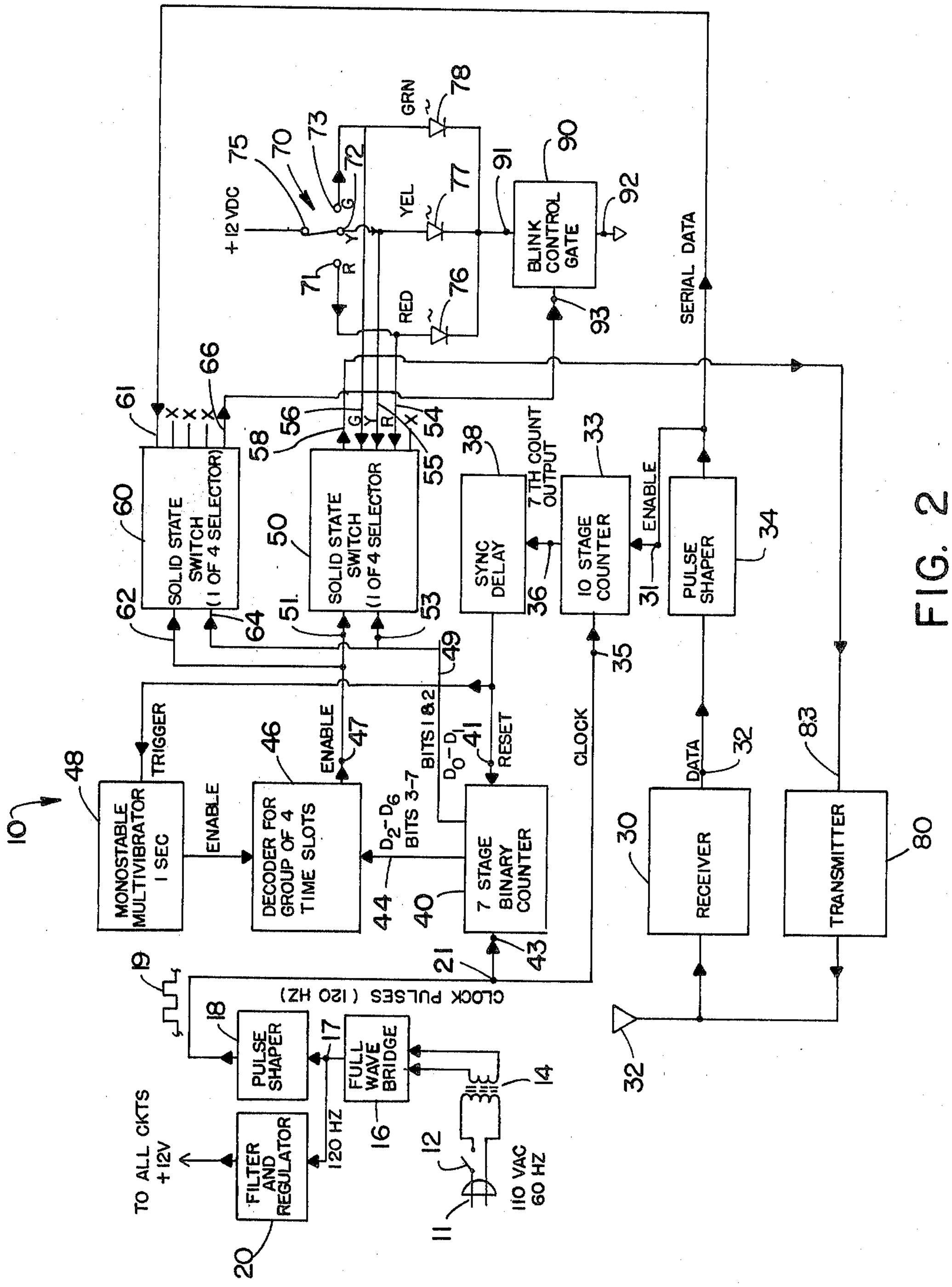
FIG. 2 is an electrical circuit diagram partly in block and schematic form showing one of the substantially identical remote desk units shown in FIG. 1.

Each desk unit 10 as shown in FIG. 2 receives operating power from 110 volt AC supply 11 through a power on/off switch 12 and a step-down transformer 14. The 60 Hz pulses from the secondary of step-down transformer 14 are applied to a full wave bridge 16 which provides 120 Hz full wave rectified pulses at output terminal 17. The 120 Hz signals are applied to a pulse shaper 18 which narrows the 120 Hz pulses which are then employed as system clock pulses 19. Also the 120 Hz signals from circuit 16 are applied to an input terminal of a filter and regulator circuit 20 which provides a regulated 12 VDC output power supply voltage for the remaining circuits.

Figure 4:
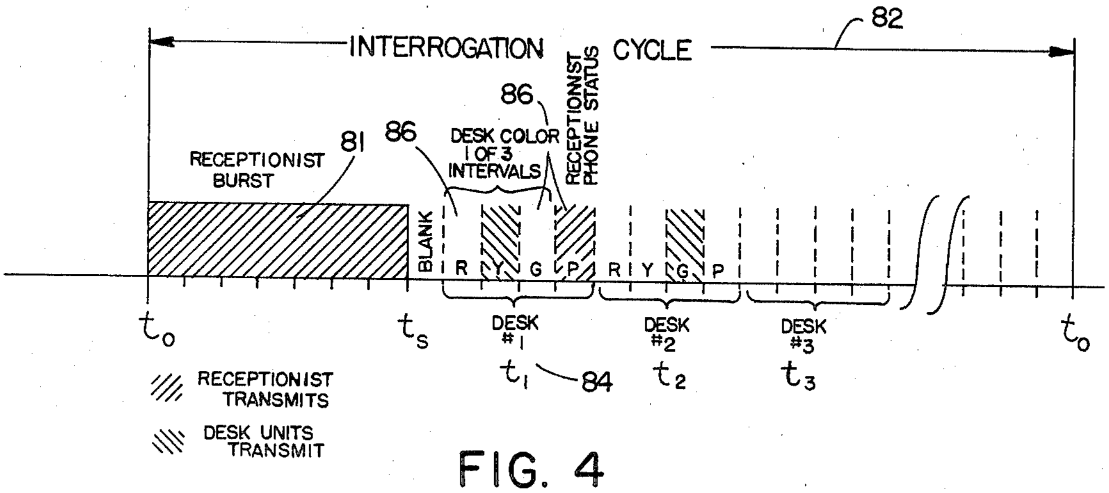
FIG. 4 is a waveform diagram illustrating the time division multiplexing system employed in the system of the preferred embodiment of the invention.

The 120 Hz clock pulses 19 are applied to an input terminal 45 of a 7 stage binary counter 40 which in the preferred embodiment is a commercially available 4024 integrated circuit chip. The binary counter 40 is synchronized with identical counters in other desk units 10 and with the centrally located receptionist unit 100 by a 150 kHz burst signal transmitted by the receptionist unit 100 through a receiver 30 coupled to an antenna 32 and tuned to receive the carrier frequency and which demodulates the received CW signals in a conventional manner to provide logic level digital output '1' signals when a carrier signal is present and a logic '0' signal at output terminal 32 in the event that there is no carrier present. These digital logic level signals are applied to a pulse shaper circuit 34 which narrows and shapes the data signals and applies them to a first input terminal 31 of a ten stage counter 53 which also receives clock pulses 19 at a second input terminal 35. The ten stage counter is a commercially available 4017 integrated circuit chip employed to generate a system sync pulse in response to the receipt of a burst signal 81 which as seen in FIG. 4 occupies 7 data intervals corresponding to seven of the 8.3 ms clock pulses. Thus, counter 33 is enabled by pulses from circuit 34 to count clock pulses and its output terminal 36 provides an output sync pulse only after seven consecutive clock pulses have been counted. This pulse is delayed by a sync delay circuit 38 which includes a parallel RC network to slightly delay the sync pulse which is then applied as a reset pulse to input terminal 41 of seven stage counter 40.

Counter 40 responds to clock pulses applied at input 43 and to the reset pulse to provide continuously changing count representative (and therefore time representative) digital signals at five output lines 44 which are coupled to a selectively enabled decoder circuit 46. The decoder circuit is enabled during each interrogation interval 82 (FIG. 4) by a one second output pulse from a monostable multivibrator 48 triggered by a reset pulse from sync delay circuit 38. In the preferred embodiment circuit 46 is a fixed diode matrix wired to respond to the digital signals on lines 44 to provide an enable signal only when the five bit signal from counter 40 corresponds in time to the time interval 84 (FIG. 4) for the desk unit programmed in a conventional manner in matrix 46. Depending on the desk unit this can occur during any time interval $t_1$, $t_2$, $t_3$, etc. during the time period $t_s$ to $t_o$ in FIG. 4 depending on which desk unit for which matrix 46 is programmed. Instead of a decoding fixed diode matrix, a five position programmable digital switch and comparator circuit could also be employed for circuit 46. The enable output 47 signal from circuit 46 stays activated for a duration of four clock pulses or data intervals 86 (FIG. 4) and uniquely occurs at a time during each interrogation cycle in time relationship corresponding to an assigned desk unit.

The enable signal from circuit 46 is employed to enable state switches 50 and 60 for inserting an extracting status representative data information in the proper time interval for each desk unit in the system. Both of the solid state switches 50 and 60 are contained on a commercially available 4052 integrated circuit. The enable signal on input terminal 51 enables switch 50 in cooperation with a second timed coincidence enable signal at input 53 to couple input data on lines 54, 55, and 56 to an output 58 for data intervals corresponding to the assigned time intervals for a given desk unit programmed in circuit 46. Circuits 50 and 60 thus receive another enable signal from counter 40 through two data lines 49 which enables the switches at the proper time interval for particular status information to be communicated.

As seen in FIG. 4 during each interrogation cycle 82 each of the desk units has an assigned time interval 84 such as $t_1$, $t_2$, $t_3$, etc. in the cycle and each time interval is divided into four 8.3 ms data intervals 86 permitting four bits of status information to be communicated. In the preferred embodiment, three of these bits are employed to activate red, yellow or green status identification lights at the receptionist unit while the fourth bit is employed to communicate to the desk unit incoming telephone call data from the receptionist.

In order to communicate status information from the desk unit 10 to the receptionist unit 100, as to the red, yellow or green status indicators, a three position switch 70 is provided. Solid state switch 50 has its three inputs 54, 55 and 56 coupled to the red, yellow and green positions 71, 72, and 73 respectively of switch 70 for receiving a logic '1' signal therefrom depending upon the position of the movable switch arm. When switch 70 is in a position shown (i.e. at the yellow position) corresponding to desk unit No. 1, for example, as shown in FIG. 4, a logic '1' is applied to input line 55 of switch 50 which couples a logic '1' signal to the input of transmitter 80 causing transmitter 80 coupled to antenna 32 to transmit a carrier wave frequency pulse during the second data pulse interval of time interval $t_1$ as represented in FIG. 4. Similarly if switch 70 were in position 71 or 73, a data pulse occurring during one of these data intervals would be applied through switch 50 to transmitter 80 to activate the transmitter during one or the other of these data intervals.

The positioning of switch 70 in one of the three positions likewise will apply the logic '1' of 12 VDC signal coupled to common switch terminal 75 to one of the three light emitting diodes 76, 77, or 78 having their anodes coupled to switch contacts 71, 72 and 73 respectively and their cathodes commonly coupled to the input 91 of a blink control gate 90 having its output terminal 92 grounded. The blink control circuit has an input control terminal 93 which receives a control signal from solid state switch 60 during only the fourth data pulse interval corresponding to the telephone receipt information upon receipt from the receptionist unit of a pulse occurring during that data pulse interval. Thus, as explained below in connection with the description of the receptionist unit 100 shown in FIG. 3, the receptionist unit also transmits in a predetermined time fashion, signals for each of the desk units during the fourth data period thereof which are received by the desk unit through receiver 30 and applied to pulse shaping circuit 34 to an input 61 of solid state switch 60 which will provide an output signal at output 66 which occurs in time coincidence with the receipt of an enable signal at input terminals 62 and 62 during only the fourth data pulse interval (corresponding to the telephone information segment) to apply a control output signal, input 93 of blink control gate 90 thereby causing the flashing of one of the LED's 76, 77 or 78 which is activated, depending on the position of switch 70. This will cause flashing of the LED indicating to the office occupant that an incoming call is awaiting attention.

Receiver 30 and transmitter 80 are of conventional construction to operate in the 100–400 kHz frequency band. They may share a common RC oscillator tuned in the preferred embodiment to 150 kHz. The transmitter is keyed in a CW mode of operation by data pulses applied at its input terminal 83. Antenna 32 is common to the transmitter and receiver and in the preferred embodiment the AC power line was employed as the antenna by capacitively coupling the receiver and transmitter thereto. Although RF energy is employed for the transmission of information between each desk unit and the receptionist unit, other forms of energy such as ultrasonics, infrared or the like may be employed.

The display unit 15 shown in FIG. 1 can be a slave type indicator panel directly wired to LEDs 76, 77 and 78 or contains its own receiver and demodulating logic circuit substantially the same as that of circuit 10 for wireless operation. Each of the desk units is substantially identical with the only difference being the programming of decoder 46 to uniquely provide signals occurring during and therefore defining the time interval for each of the desk units. Having described one of the substantially identical desk units 10, a description of the receptionist unit 100 follows.

Figure 3:
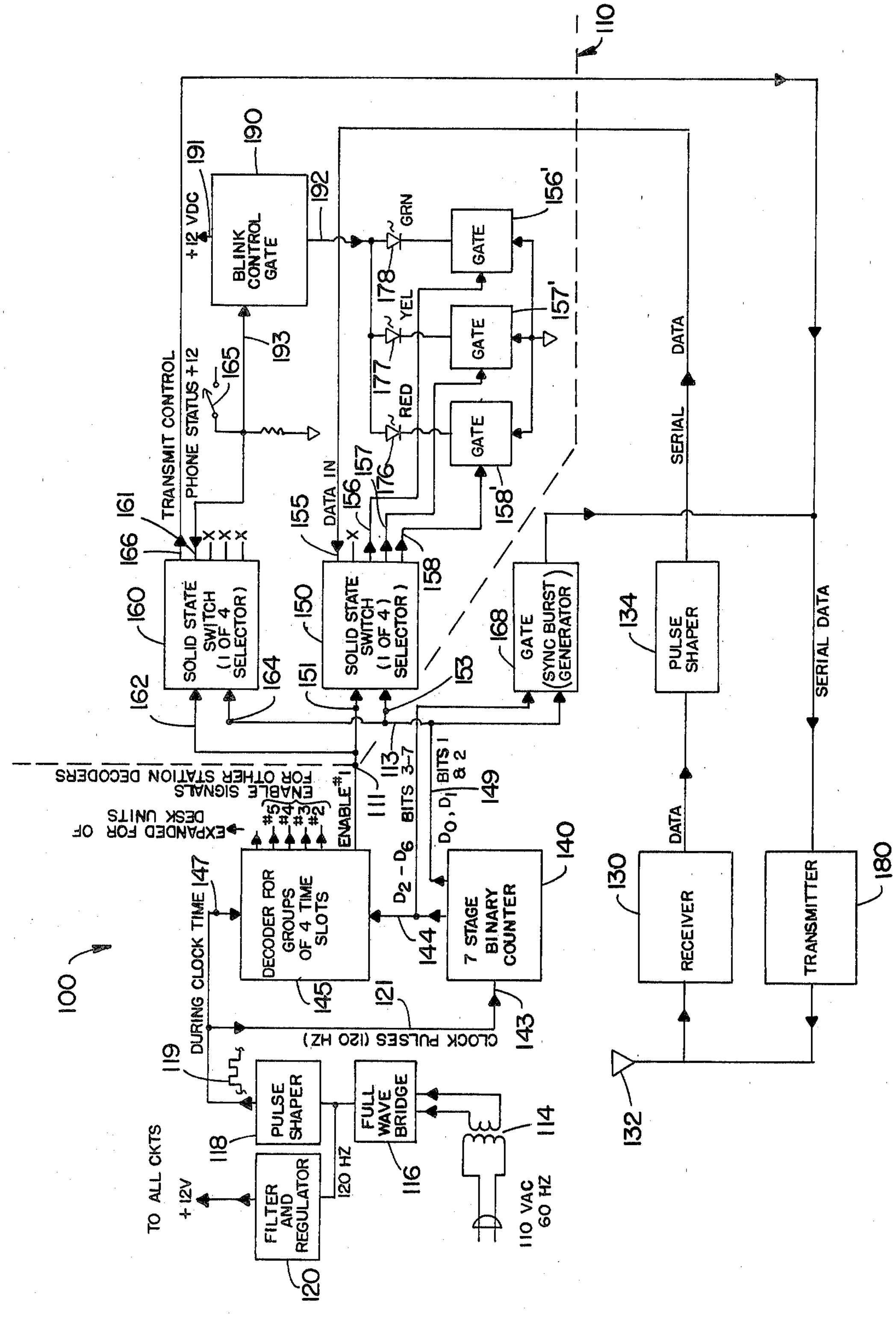
FIG. 3 is an electrical circuit diagram partly in block and schematic form showing the receptionist unit shown in FIG. 1.

Referring now to FIG. 3 there is shown a receptionist unit 100 for which power is supplied from the 110 volt line via a step down transformer 114 to a full wave bridge rectifier circuit 116 in the same manner as that shown in FIG. 2. Bridge 116 is coupled to a filter and regulator circuit 120 to provide +12 VDC applied as operating power to the remaining circuits in a conventional manner. The 120 Hz pulses from circuit 116 are also applied to a pulse shaper circuit 118 to provide clock pulses 119 at an output terminal thereof which are applied by line 121 to an input terminal 143 of a self resetting seven stage 4024 binary counter circuit 140 which is identical to circuit 40 shown in FIG. 2. A five line data output bus 144 is coupled to five input terminals of decoder circuit 145 which is several conventionally interconnected solid state integrated circuits type 74C42. Circuit 145 receives a five bit count and provides sequentially occurring output enable signals at output lines 1–30 occurring during each interrogation cycle to define the time interval for each of the desk units. In the embodiment shown using 120 Hz clock pulses and four data intervals, 30 such units can be provided for the 1.067 second interrogation cycle. Naturally if the clock frequency were increased a greater number of units could be accommodated. Counter 140 also has a two line output 149 providing two-bit digital signals identifying each of the four data intervals in each of the available time intervals for a desk unit. The clock pulses 119 are also applied to an inhibit terminal 147 of circuit 145 to inhibit the enable signals during the leading and trailing edge of each data interval such that data is examined only during the mid portion of each data interval.

As can be appreciated, the receptionist unit includes an array of three red, yellow and green indicator lights 176, 177 and 178 respectively with three such lights being associated with each of the desk top units. Thus, for a 30 unit system the array includes 90 lights. In FIG. 3 only one such array is shown and is included in a display circuit 110 which is identically repeated for each of the desk units in the system. Each of the display circuits 110 has one input terminal 111 coupled to an enable output terminal from decoder 145 associated with the particular desk unit display. Further, the two bit data line 149 from counter 140 is coupled to a second input terminal 113 for each of the desk display circuits 110 to provide in combination with the enable signal at terminal 111, digital signals applied to control a first solid state switch 150 having input terminals 151 and 153 coupled as shown and comprising a switch substantially identical to switch 50 of the desk top unit of FIG. 2; and a second solid state switch 160 having input terminals 162 and 164 and which is substantially identical to switch 60 in FIG. 2.

Switch 150 has a data input terminal 155 for receiving data transmitted by the desk top unit of FIG. 2 received through antenna 132, a receiver 130 and a pulse shaper circuit 134. The serial data from pulse shaper 134 constitutes sequential interrogation cycles of pulses including signals occurring during one of the first three data intervals 86 of each of the time intervals associated with each desk unit in the system. The data in on terminal 155 is sequentially supplied in time coincidence with the first three data slots by output conductors 156, 157, and 158 coupled to sample and hold latching gate circuits 156', 157', and 158' (type 4066) associated with and coupled in series with LED's 178, 177, and 176 respectively as shown in FIG. 3. The cathodes of light emitting diodes 176, 177, and 178 are coupled to one input terminal of each of the gates as shown in FIG. 3, while the remaining output terminal of the gates are commonly coupled to system ground. The commonly coupled anodes of the diodes are coupled to an output terminal 192 of a blink control gate 190 having an input terminal 191 coupled to the +12 VDC supply. The blink control gate will be normally closed such that depending upon the actuation of switch 70 in the desk unit to transmit a carrier pulse during one of the data intervals such as the yellow pulse in interval 2 of the first desk top unit shown in the preferred embodiment, a pulse will occur for example on line 157 in time coincidence with the enable signal on line 111 for the desk top unit to activate gate 157' and the yellow LED 117.

Similarly, solid state switch 160 receives a phone status command at input terminal 161 thereof if a phone call has been received for desk unit No. 1 illustrated and the phone status switch 165 closed by the receptionist. This applies a positive logic signal to input terminal 161 and to input terminal 193 of blink control gate 190 such that solid state switch 160 will provide a pulse at output terminal 166 thereof during the fourth data interval as illustrated in FIG. 4. The pulse is applied to transmitter 180 for sending the phone information signal to the desk unit No. 1 as shown and disclosed in FIG. 2. At the same time, the logic '1' signal applied to blink control gate 190 causes the activated yellow LED 177 to blink indicating to the receptionist that the phone information has been supplied to the occupant of the office with which desk unit No. 1 is associated.

In order to synchronize each of the desk top units, as discussed earlier, a synchronization burst is sent during the first seven data intervals of each interrogation cycle. This is achieved by coupling the seven bit data lines 144 and 149 from counter 140 to a gate circuit 168 which constitutes a 4051 integrated circuit chip. The output of gate 168 remains at a logic '1' level only during the first seven received counts corresponding to the first seven data intervals of each interrogation cycle to enable transmitter 180 thereby transmitting a carrier signal 81 during this pulse interval for each interrogation cycle 82. Transmitter 180 and receiver 130 are identical to their counterparts in the desk units 10 and antenna 132 as noted above can be the 110 VAC line when capacitively coupled to the transmitter and receiver.

Thus, with the system of the present invention, a unique time division multiplexed signaling system is provided in which transceivers located at remote locations are synchronized with a transceiver located at a central or receptionist area to provide two-way wireless communication. The logic circuits, in effect, demodulate the received signals or modulate transmitted signals to provide the synchronization and transfer of data permitting one or more status indications at a remote location to be displayed at a central location. Conversely, the central location can provide data to each of the remote locations such as the existence of an incoming phone call in the environment of the preferred embodiment of the invention. It will become apparent to those skilled in the art that various modifications of the preferred embodiment described herein can be made without departing from the spirit or scope of the invention as defined by the appended claims.

The embodiments of the invention in which an exclusive property or privilege is claimed are defined as follows:

1. A signaling system for indicating status information from one or more remote locations to a central location comprising:

logic circuit means for generating periodic single frequency signals including synchronization signals and a plurality of time intervals for the insertion of data information therein, wherein each time interval bears a predetermined time relationship to said synchronization signal and corresponds to an assigned remote unit and wherein each time interval includes a plurality of discrete data intervals, at least one remote unit including means for providing status indicating data signals, said providing means coupled to said logic circuit means for the insertion of data during a predetermined data and time interval assigned the remote unit, a centrally located unit for receiving said data signals and including means for displaying one of a plurality of status conditions of said at least one remote location in response to said data signals.

2. The system as defined in claim 1 wherein said logic circuit means includes a source of clock pulses, counter means coupled to said source for providing digital count signals therefrom, and decoder circuit means coupled to said counter means and responsive to signals therefrom for providing said periodically occurring synchronization signals and pulses occurring to define a plurality of time intervals.

3. The system as defined in claim 2 wherein each remote and central unit includes said logic circuit.

4. The system as defined in claim 3 wherein each of said remote and central units includes a transmitter and a receiver each coupled to associated logic circuit means for the wireless transfer of said data and synchronization signals therebetween.

5. The system as defined in claim 4 wherein said providing means includes switch means movable to indicate two or more status conditions.

6. The system as defined in claim 5 wherein said displaying means includes light emitter indicators for visually displaying status information at said central location.

7. The system as defined in claim 6 wherein said centrally located unit includes switch means coupled to said decoder circuit means for selectively providing information to each of said remote units.

8. The system as defined in claim 7 wherein each of said remote units includes display means coupled to said associated decoder circuit means for visually displaying information from said central location.

* * * * *

UNITED STATES PATENT AND TRADEMARK OFFICE

CERTIFICATE OF CORRECTION

PATENT NO. : 4,392,132

DATED : July 5, 1983

INVENTOR(S) : Harry G. Derks

It is certified that error appears in the above—identified patent and that said Letters Patent is hereby corrected as shown below:

Column 1, line 26:
"3,155,597" should be --3,155,957--

Column 1, line 27:
"3,430,244" should be --3,430,224--

Column 3, line 13:
"yellor" should be --yellow--

Column 3, line 14:
"unit" should be --units--

Column 3, line 56:
"45" should be --43--

Column 4, line 3:
"counter 53" should be --counter 33--

Column 5, line 22:
"of" should be --or--

Column 5, line 43:
"62 and 62" should be --62 and 64--

UNITED STATES PATENT AND TRADEMARK OFFICE

CERTIFICATE OF CORRECTION

PATENT NO. : 4,392,132

DATED : July 5, 1983

INVENTOR(S) : Harry G. Derks

It is certified that error appears in the above—identified patent and that said Letters Patent is hereby corrected as shown below:

Column 5, line 66:
"contains" should be --contain--

Column 8, Claim 6, line 51:
"emitter" should be --emitting--

Signed and Sealed this

*Twenty-fifth* Day of *October 1983*

[SEAL]

*Attest:*

GERALD J. MOSSINGHOFF

*Attesting Officer* *Commissioner of Patents and Trademarks*